US011576430B2

(12) United States Patent
Larsen et al.

(10) Patent No.: US 11,576,430 B2
(45) Date of Patent: Feb. 14, 2023

(54) WATER PIPE WITH LID THAT COVERS THE BOWL AND MOUTHPIECE, AND RELATED METHODS OF ASSEMBLY AND USE

(71) Applicant: Cory Dennis Larsen, Edmonton (CA)

(72) Inventors: Cory Dennis Larsen, Edmonton (CA); Nicholas Joseph Kazakoff, Edmonton (CA); Brendan Peter Gallagher, Edmonton (CA); Johnathon Marc E Webster, Edmonton (CA)

(73) Assignee: Cory Dennis Larsen, Edmonton (CA)

( * ) Notice: Subject to any disclaimer, the term of this patent is extended or adjusted under 35 U.S.C. 154(b) by 231 days.

(21) Appl. No.: 16/872,353

(22) Filed: May 11, 2020

(65) Prior Publication Data

US 2020/0352222 A1 Nov. 12, 2020

(30) Foreign Application Priority Data

May 9, 2019 (CA) .................................. CA 3042820

(51) Int. Cl.
*A24F 1/30* (2006.01)
*A24F 7/00* (2006.01)
(Continued)

(52) U.S. Cl.
CPC .................. *A24F 1/30* (2013.01); *A24F 5/10* (2013.01); *A24F 7/00* (2013.01); *F16L 55/115* (2013.01)

(58) Field of Classification Search
None
See application file for complete search history.

(56) References Cited

U.S. PATENT DOCUMENTS 4,116,204 A * 9/1978 Kline .................. A24F 1/30
220/8
4,161,954 A * 7/1979 Fornaciari ............ A24F 1/14
131/180
(Continued)

FOREIGN PATENT DOCUMENTS

CN 106418690 2/2017
CN 106998807 8/2017
(Continued)

OTHER PUBLICATIONS

Amazon, Resolution Caps Universal Caps for Cleaning, Storage and Odor Proofing Glass Water Pipes/Rigs, accessed Jan. 29, 2019, 7 pages, URL=https://www.amazon.com/ResOlution-Universal-Cleaning-Storage-Pro.

(Continued)

*Primary Examiner* — Michael J Felton
*Assistant Examiner* — Katherine A Will
(74) *Attorney, Agent, or Firm* — Robert A. Nissen (57) ABSTRACT

A water pipe has: a water chamber; a bowl or bowl connector; a hollow neck forming a mouthpiece; and a lid that seals both the mouthpiece and the bowl or bowl connector when the lid is in a closed position. A method of operating a water pipe includes assembling the lid in the closed position on the water pipe. A method of operating a water pipe includes, while the lid is out of the close position: combusting or vaporizing a smokable substance in the bowl to create smoke vapor; and drawing the smoke vapor through the water chamber and out the mouthpiece.

23 Claims, 5 Drawing Sheets

(51) Int. Cl.
*A24F 5/10* (2006.01)
*F16L 55/115* (2006.01)

(56) References Cited

U.S. PATENT DOCUMENTS

| | | | |
|---|---|---|---|
| 4,213,469 | A | 7/1980 | Ramsay |
| 4,241,741 | A | 12/1980 | Cabados |
| 5,464,026 | A | 11/1995 | Gardner |
| 6,196,232 | B1 | 3/2001 | Chkadua |
| 7,624,734 | B2 | 12/2009 | Balch |
| 7,658,197 | B1 | 2/2010 | Villagomez |
| 8,955,521 | B1 | 2/2015 | Hanson |
| 9,301,548 | B2 | 4/2016 | Liu |
| 9,332,787 | B2 | 5/2016 | Liu |
| 9,486,014 | B2 | 11/2016 | Liu |
| 2006/0086364 | A1 | 4/2006 | Liu |
| 2010/0126516 | A1 | 5/2010 | Yomtov |
| 2013/0042865 | A1 | 2/2013 | Monsees |
| 2014/0150783 | A1 | 6/2014 | Liu |
| 2015/0128971 | A1 | 5/2015 | Verleur |
| 2015/0173420 | A1 | 6/2015 | Shi |
| 2015/0257443 | A1* | 9/2015 | Rado ............... A24F 42/10 392/390 |
| 2016/0262459 | A1 | 9/2016 | Monsees |
| 2016/0324211 | A1 | 11/2016 | Yankelevich |
| 2016/0345623 | A1 | 12/2016 | Pearson |
| 2017/0055571 | A1 | 3/2017 | Reyes |
| 2017/0086507 | A1 | 3/2017 | Rado |
| 2017/0162979 | A1 | 6/2017 | Liu |
| 2017/0215479 | A1 | 8/2017 | Kies |
| 2017/0333651 | A1 | 11/2017 | Qiu |
| 2018/0035709 | A1 | 2/2018 | Lara |
| 2018/0077967 | A1 | 3/2018 | Hatton |
| 2018/0116291 | A1 | 5/2018 | Monsees |
| 2019/0202608 | A1* | 7/2019 | Evans ............... B65D 43/0222 |

FOREIGN PATENT DOCUMENTS

| | | |
|---|---|---|
| DE | 4240383 | 12/1991 |
| DE | 202011050108 | 1/2012 |
| EP | 0327655 | 2/1988 |
| EP | 3167728 | 5/2015 |
| EP | 2878213 | 6/2015 |
| GB | 24280 | 10/1912 |
| GB | 2538424 | 11/2016 |
| GB | 2540259 | 1/2017 |
| KR | 20160026464 | 3/2016 |
| KR | 20160085032 | 7/2016 |
| KR | 20160002766 | 8/2016 |
| KR | 20160003338 | 9/2016 |
| WO | 2015069391 | 5/2015 |
| WO | 2015069914 | 5/2015 |
| WO | 2016193705 | 12/2016 |
| WO | 2017079453 | 5/2017 |
| WO | 2018048813 | 3/2018 |

OTHER PUBLICATIONS

Wikipedia, Bong, available as early as Dec. 2010, 4 pages, URL=https://en.wikipedia.org/wiki/Bong.
Genius Pipe, accessed Aug. 3, 2018, 8 pages, URL=https://geniuspipe.com.
Dhgate, Online Cheap Metal Magnetic Pipe Magnetic Metal PipeTinkSky Mini Type Foldable Metal Magnet Cigarette Tobacco Smoking Pipe Magnet Folding Pipe, accessed Aug. 3, 2018, 6 pages, URL=https://www.dhgate.com/product/metal-magnetic-pipe-magnetic-metal-pipetinksky/265792849.html.
Wickie Pipes, Steven Mattern: Storage Wood Pipe, accessed Aug. 3, 2018, 4 pages, https://www.wickiepipes.com/products/steven-mattern-storage-pipe?_store=kunstore&nosto=productpage-nosto-1.
Etsy, SteveMatternDesign Snap Pipe—Long Leaf Pine, accessed Aug. 3, 2018, 4 pages, https://www.etsy.com/ca/listing/57154023/snap-pipe-long-leaf-pine?show_sold_out_detail=1.
Moksha Bongs, 6 Inch Metal Pocket Bong White Color—Stealth Pipe, available as early as Mar. 2019, 7 pages, https://www.mokshabongs.com/?route=product%2Fsearch&filter_name=metal%20Bong.
Dutch Headshop, Budbomb, available as early as Mar. 2019, 4 pages, https://www.dutch-headshop.eu/budbomb.
shopclues.com, RawBong Test Tube Design Portable Pocket Bong, available as early as Mar. 2019, 3 pages.
Smoke Cartel, How Does a Bong Work? A Guide to the Water Pipe, available as early as Mar. 2019, 10 pages.
Zativo, Metal Bong Travel Size, available as early as Mar. 2019, 2 pages.
Amazon, Metier Metal Pocket Bong (3 cm×3 cm ×15 cm, Golden), available as early as Mar. 2019, 8 pages.
Grow High, Pocket Collapsable Bong, available as early as Mar. 2019, 2 pages.
Machine Translation of claims and abstract of RU2015105675, 5 page, available as early as Aug. 10, 2015.

* cited by examiner

WATER PIPE WITH LID THAT COVERS THE BOWL AND MOUTHPIECE, AND RELATED METHODS OF ASSEMBLY AND USE

TECHNICAL FIELD

This document relates to water pipes with lids that cover the bowl and the mouthpiece, and their related methods of use and assembly.

BACKGROUND

The mouthpiece of a water pipe, often referred to as a bong or dabbing rig, is typically sealed using a rubber stopper. Similarly, the bowl of a water pipe may also be sealed using a separate rubber stopper.

SUMMARY

A water pipe is disclosed comprising: a water chamber; a bowl or bowl connector; a hollow neck forming a mouthpiece; and a lid that seals both the mouthpiece and the bowl or bowl connector when the lid is in a closed position.

A method of operating a water pipe is disclosed comprising assembling the lid in the closed position on the water pipe.

A method of operating a water pipe is disclosed, the method comprising, while the lid is out of the close position: combusting or vaporizing a smokable substance in the bowl to create smoke vapor; and drawing the smoke vapor through the water chamber and out the mouthpiece.

In some cases, a one-piece lid may be provided that covers a mouthpiece (i.e. glass stem) and bowl at the same time in a water pipe.

In some cases, a one-piece piece lid may be provided that attaches on a water pipe to stop water from leaking out of the water pipe.

In some cases, a one-piece lid may be provided that integrates into the body of the water pipe rather than traditional silicone covers.

In some cases, a one-piece lid may be provided that contains smell from prior smoking uses of the water pipe.

In various embodiments, there may be included any one or more of the following features: The lid independently seals against both the mouthpiece and the bowl or bowl connector when the lid is in the closed position. The lid comprises: a first part that seals with the mouthpiece when the lid is in the closed position; and a second part that seals with the bowl or bowl connector when the lid is in the closed position. The first part and the second part are seals, and the lid is structured to compress the first part and the second part when moving into the closed position. The second part is a seal that has a domed shape with an axial thickness that is greater at a center of the second part than at a peripheral edge of the second part. The hollow neck forms a first tube; the lid forms a second tube; and the first tube is nested within the second tube when the lid is in the closed position. The first tube is open-ended to define the mouthpiece; and the second tube has a closed top end that rests upon the mouthpiece when the lid is in the closed position. One or more of the first tube and the second tube are frustoconical. The lid is structured to move between a) a seated, open position and b) the closed position. The lid is structured to rotate between the seated, open position and the closed position. The hollow neck defines an axis, and the lid is structured to: be translated along the axis of the hollow neck onto the hollow neck into the seated, open position; and be rotated around the axis of the hollow neck to move the lid into the closed position. The lid comprises a flange that is structured to slide over and seal to the bowl or bowl connector when moving into the closed position. The lid forms a tube; the hollow neck is nested within the tube when the lid is in the closed position; and the flange is formed by a plate that extends radially from the tube. A quick-release lock to secure the lid in the closed position. The water chamber and the hollow neck form a pipe body; and the quick-release lock comprises: a pin, on one of the lid and the pipe body; and a guide surface, on the other of the lid and the pipe body, along which the pin moves to secure the lid in the closed position. The pin extends radially out of an external surface of the hollow neck; and the guide surface is formed on an inner surface of the lid. The guide surface forms a channel that is defined in a circumferential direction around at least a portion of the inner surface of the lid. The hollow neck is threaded to or integrally formed with the water chamber. The hollow neck forms a stand pipe; and a stem of the bowl or bowl connector branches upwardly off the water chamber or hollow neck at an acute angle with an axis of the hollow neck. A diffuser screen between the mouthpiece and the water chamber. The water pipe forming one or more of a bong, a quartz banger, and a dabbing rig. The bowl and a heating element within or adjacent the bowl. A method of operating the water pipe comprising assembling the lid in the closed position on the water pipe. A method of operating the water pipe while the lid is out of the close position. Combusting or vaporizing a smokable substance in the bowl to create smoke vapor; and drawing the smoke vapor through the water chamber and out the mouthpiece. Assembling the lid in the closed position on the water pipe.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

A water pipe is a filtration device generally used for smoking cannabis, tobacco, or other herbal substances, whether using combustion or vaporization techniques. Water pipes may be glass or plastic or incorporate glass or plastic parts with metal components as well. Glass bongs may be made from heat resistant borosilicate glass, such as Pyrex™ glass allowing the bong to withstand repeated use and heat exposure without breaking.

A water pipe may be constructed from a suitable vessel and incorporate various categories of parts. The water pipe may have a bowl in which the smokable substance is placed in use, the bowl being mounted on top of a water reservoir structure, for example above the water level in the water reservoir. The interior of the reservoir is partially filled with water. Extending downward from the bowl into the reservoir may be a tubular hollow stem, with its lowermost extremity immersed in the water. The interior portion of the reservoir structure (i.e., the air space or head space) above the level of the water forms a chamber into which smoke may be collected after being filtered through the water. Once the bong has a fair amount of smoke built up within, either a carburetor or pinch valve is uncovered or the stem is separated from the bong, allowing the remaining smoke to be inhaled. One or more neck, for example a flexible hose forming a mouthpiece, extends outward, for example upward, from the smoke collection portion of the reservoir or from a neck base extending from and in fluid communication with the reservoir.

The user may use the mouthpiece to inhale smoke collected within the water chamber or to draw smoke from the smokable substance, through the water in the water chamber, and into the user. Passing upwards through the water in the form of bubbles, smoke gradually fills the smoke collection portion of the reservoir, and when sufficient smoke has been collected, passes on through the neck to the smoker. By drawing the smoke through a water reservoir, the smoke is filtered and cooled.

A water pipe may be used to vaporize and filter concentrates or oils of smokable substances. During vaporization, the substance to be vaporized is heated to a temperature below its combustion point but high enough to release the active ingredient within a vapor. Very little or no combustion may occur during the vaporization process, thus avoiding excessive ashy smokiness by vaporization of a material to be smoked or consumed. A vaporization water pipe may form a rig that uses a super-heated metallic or non-metallic (such as quartz) pin or nail, where the pin may be heated (by external means such as using a blowtorch, or internal means such as using an internal heating element) and put into contact with the oil, resin, or other vaporizable material. In a rig configuration, often called a dabbing rig, the super-heated pin or nail, which forms a type of bowl, is dabbed with the oil, resin, or other material to be smoked or consumed. Vapor from the super-heated pin or nail is pulled through the liquid and into the mouthpiece for consumption by the user. Vaporized oil or resin consumed through the rig configuration may be smoother and more free of large droplets of water than in the case of a bong that combusts the smokable substance, however, a dabbing rig configuration involves several pieces and steps in order to deliver a smooth, easily consumable vapor stream.

Figures 5, 6:
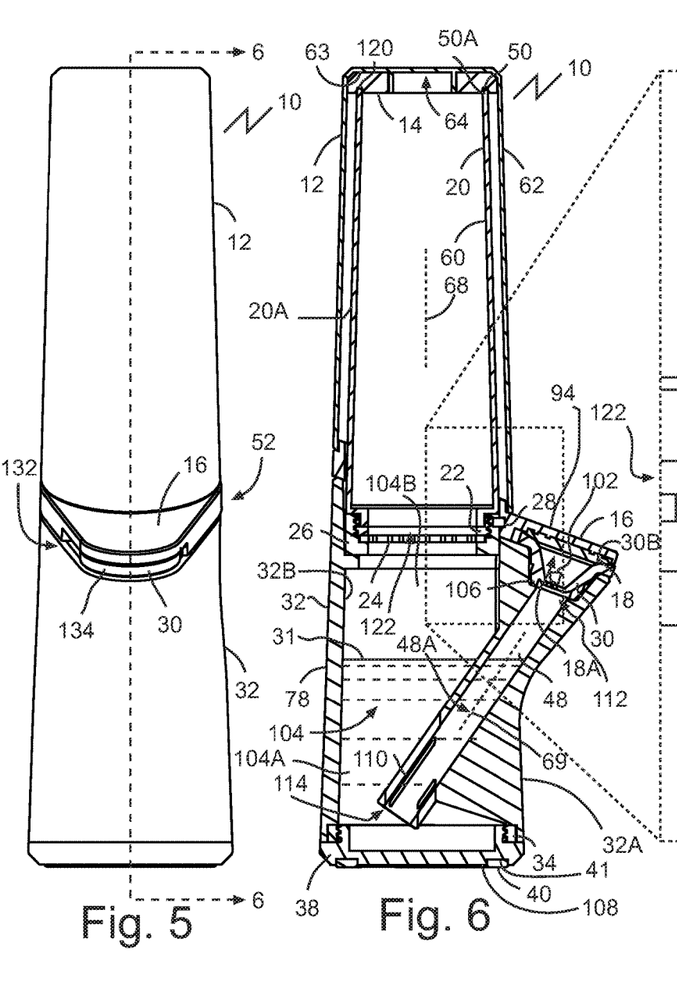
FIG. 5 is a front elevation view of the water pipe of FIG. 1.
FIG. 6 is a section view taken along the 6-6 section lines from FIG. 5.
Figure 8:
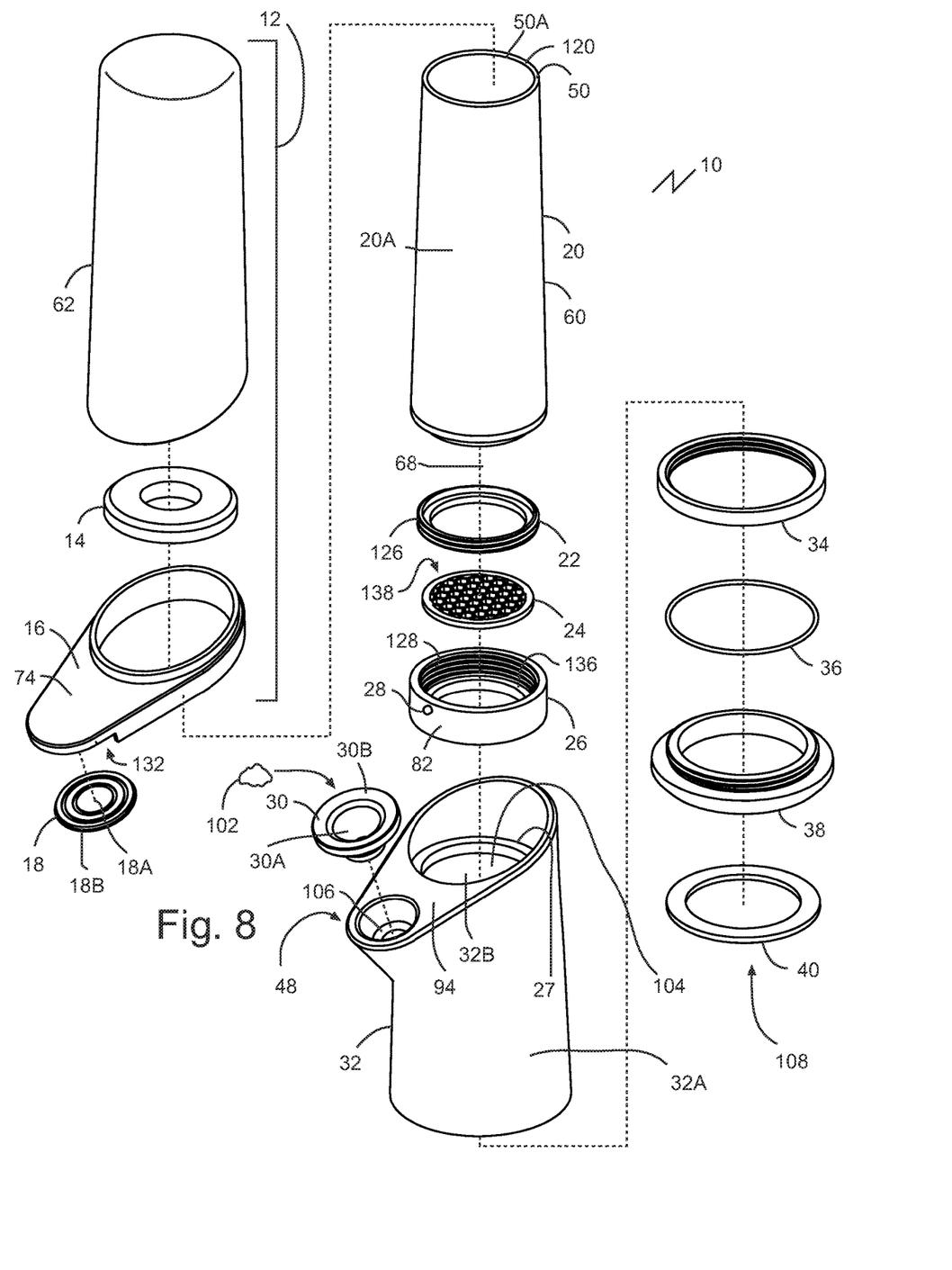
FIG. 8 is an exploded view of the water pipe of FIG. 1.

Referring to FIGS. 6 and 8, a water pipe 10 is illustrated comprising a water chamber 32, a bowl 30, a hollow neck 20, and a lid 12. The hollow neck 20 may form or otherwise define a mouthpiece 50, which may be an aperture into the neck 20 or may be provided by a separate stem or tube (not shown). The hollow neck 20 may be suitably connected to the water chamber, for example threaded or integrally formed with the water chamber 32. The lid 12 may cover, for example seal, the mouthpiece 50 and the bowl 30 at least when the lid is in a closed position 52 shown. The water pipe 10 may have a stem 48, for example formed by a pipe extended off of the bowl 30 or provided as an integral passage in the chamber 32 as shown, that extends into an interior 104 of the water chamber 32. The water pipe 10 may form one or more of a bong (shown), a quartz banger, a dabbing rig, or another suitable water pipe structure. The lid 12 may in some cases cover, for example seal, the mouthpiece 50 and a bowl connector (not shown). For example, in the case of a dabbing rig the lid may be designed to seal either the bowl of the dabbing nail present or the bowl connector if the nail is removed prior to securing the lid in place. A bowl connector may be a part, for example with a male or female connection, that connects to or otherwise mounts the bowl in use. In use, the lid 12 may be disassembled from the closed position on the water pipe. The water pipe may be operated while the lid is out of the close position, for example by combusting or vaporizing a smokable substance in the bowl to create smoke vapor, and drawing the smoke vapor through the water chamber and out the mouthpiece. Once smoking is complete, the lid may be assembled in the closed position on the water pipe.

Referring to FIGS. 6 and 8, the water chamber 32 may have a suitable structure. An exterior wall 32A of the water chamber 32 may have suitable shape, such as a frustoconical, cylindrical, tubular, spherical, or other shape. The shape of an interior wall 32B defining the interior 104 may have a suitable shape as well. For example, the walls 32A and 32B in the example shown have a slightly frustoconical shape as shown. The water basin or chamber 32 may be formed of a base 108 (which may define the base of the water pipe 10) and exterior walls or wall 32A. The water chamber 32 may be formed by one or more parts, for example the base 108 may be integral with the exterior wall 32A, or, as in the example shown, the base 108 may be configured by an assembly of parts, such as a collar plate 38, which threads into a threaded ring 34 that is connected to, for example by friction fit or adhesive or another suitable mechanism, an open base end of the water chamber 32. A gasket 36 may be provided to seal between the threaded connection. A rubber ring 40 may be provided in a slot 41 in the base 108 (plate 38) to provide a high-friction resilient surface for the base 108 to use to stably rest upon a ground or other external surface in use, for example without sliding or tilting. Referring to FIG. 6, during use the interior 104 of the water chamber 32 may be filled with filtration or cooling liquid, such as water, for example up to a suitable water line 31. Ice may be added, or cooled (below room temperature) coolant or water may be used. In some cases, the amount of water used is selected to provide a water line 31 that divides the interior 104 into a water zone 104A and a smoke collection zone 104B above the water zone 104A.

Figure 7:
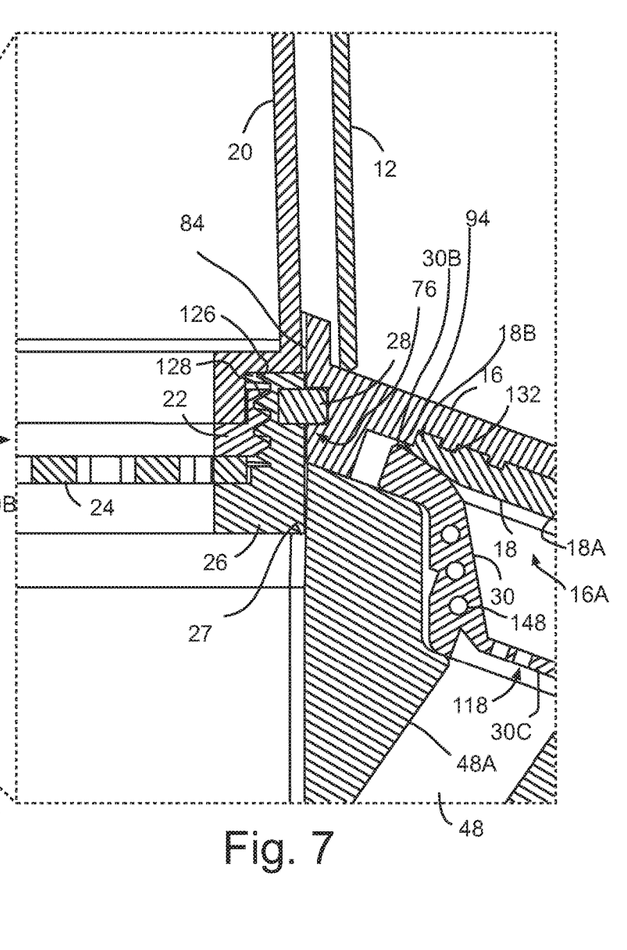
FIG. 7 is a close-up view of the area marked in dashed lines in FIG. 6.

Referring to FIGS. 6 and 8, the hollow neck 20 may have a suitable structure. An exterior wall 20A of the hollow neck 20 may have suitable shape, such as a frustoconical, cylindrical, tubular, or other shape. In the example shown the exterior wall 20A of the neck 20 has a slightly frustoconical shape that follows the tapering of the frustoconical exterior wall 32A of the water chamber 32, effectively forming in this one example a barrel whose interior wall forms the interior of the hollow neck and water chamber 32. The hollow neck 20 may be made of a suitable material such as metal or glass. The hollow neck 20 may have a cylindrical wall shape defining a first end 120 and a second end 122. The first end 120 may be open-ended to form the mouthpiece 50. In other cases, the mouthpiece 50 may be an aperture defined in the exterior wall 32A, for example a port, and may connect to a tube or hose. The second end 122 may be open-ended to connect to the water chamber 32. Referring to FIGS. 6-8, the neck 20 may connect to the water chamber 32 by a suitable mechanism, for example the second end 122 of the hollow neck 20 may be threaded into or integrally formed with the water chamber 32. In the example shown, second end 122 of the neck 20 is connected to, for example by friction fit or adhesive or another suitable mechanism, a threaded ring 22, for example that has an external threading of a seating 126. The ring 22 may mate with the water chamber 32, for example by threading into corresponding internal threading 128 of a seating ring 126, which sits upon a peripheral shoulder seat 27 of the water chamber 32.

Referring to FIGS. 6 and 8, the bowl 30 may have a suitable structure. A bowl is a structure that is shaped to receive a substance 102 to be smoked, whether a concentrate, oil, herb, plant, or other material in the case of a substance to be vaporized or combusted. The bowl 30 is historically called a bowl due to its resemblance with a kitchen bowl or cup. The bowl 30 may have an upstanding interior bowl wall 30A that terminates or widens into a flange or other suitable peripheral rim 30B. The interior bowl wall 30A may have a frustoconical (shown), cylindrical, tubular, spherical (which includes semi-spherical and other rounded shapes), or other suitable shape. The bowl 30 may be shaped and sized to receive a smoking substance 102. Referring to FIG. 7, a base 30C or other suitable part of the bowl 30 may be structured to retain substance 102 within the bowl 30 while permitting passage of vaporized or combusted substances to pass into the water chamber 32. For example, base 30C may have one or more holes 118, for example structured to permit the entry of smoke from the smoking substance 102 into the interior 104 of the water chamber 32.

Referring to FIGS. 6 and 8, the bowl 30 may mount to a suitable connector, referred to as a bowl connector. An example of a bowl connector is provided in FIGS. 6 and 8 as a bowl seat 106. The bowl 30 and seat 106 may be shaped to mate with one another, for example the bowl 30 may thread into, nest by gravity within, or fit by other suitable means such as a friction fit, within the seat 106. In this and other ways, the bowl 30 may be removable or integrally formed with the water chamber 32. A gasket (not shown) may be present for sealing between the seat 106 and bowl 30.

Figure 12:
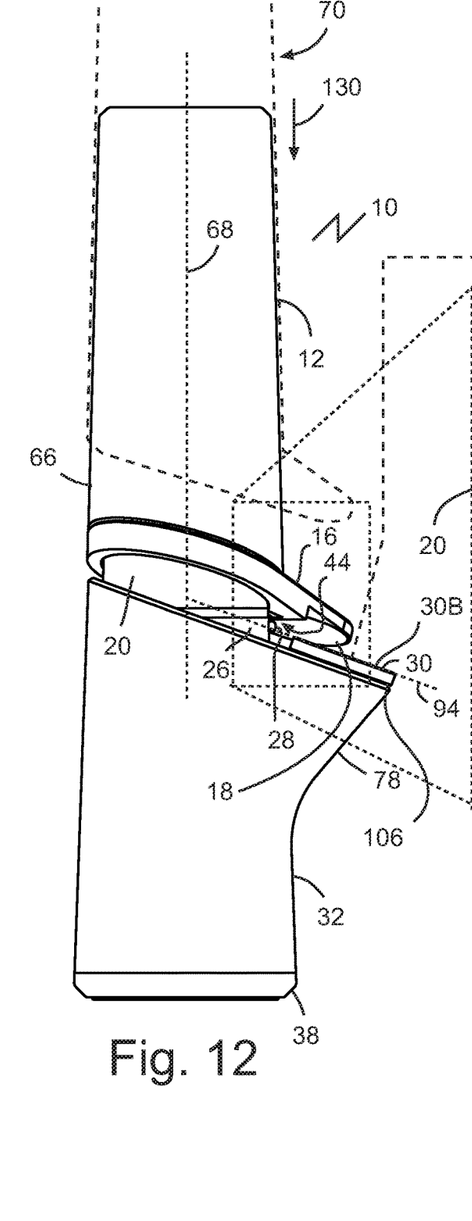
FIG. 12 is a side elevation view of the water pipe of FIG. 1 with the lid in a seated, open position, and with an intermediate position of the lid shown in dashed lines to illustrate the lid being axially inserted over the hollow neck.
Figure 14:
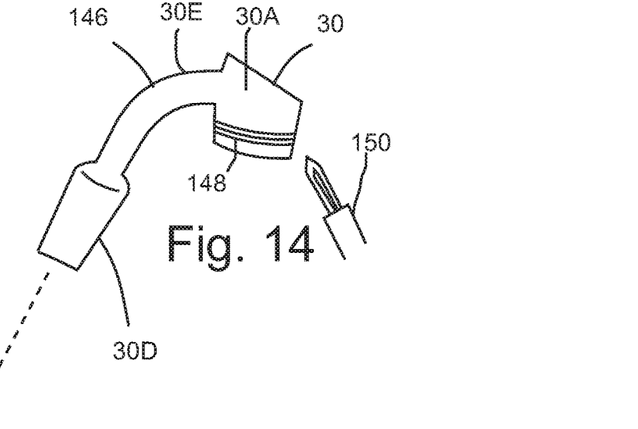
FIG. 14 is a side elevation view of a dabbing nail, with a dashed line connecting the nail to the bowl connector of FIG. 12, in order to provide a projected view of an alternative embodiment where the bowl in FIG. 12 is replaced with the nail of FIG. 14 to form a dabbing rig.

Referring to FIGS. 12 and 14, the water pipe 10 may take one of a variety of forms. In the example shown in FIG. 12, the water pipe 10 forms a bong, which is a structure that permits a user to combust and smoke a smokable substance contained within the bowl 30 during use. In other cases, the water pipe 10 may take the form of a dabbing rig. For example, if the bowl 30 of FIG. 12 were removed, and a dabbing nail 146 (FIG. 14) fitted to seat 106, then the water pipe 10 may form a dabbing rig, which is a device suited to vaporize a smokable substance other than using combustion. In the example shown the nail 146 may take a suitable form, such as a metal nail or a quartz banger. A bowl seat connector 30D, such as forming a stem, may insert within the seat 106 by a suitable connection, such as a standard tapered glassware joint or other suitable connection. The nail 146 forms a bowl 30, which is connected to connector 30D in a suitable fashion such as via a stem 30E. In use a user applies heat to the bowl 30 of the nail 146, for example by energizing a heating element 148 within or adjacent the bowl 30, or by applying heat from an external heat source such as using a lighter or blow torch 150. Once the bowl 30 has reached as sufficient heat, a user may then dab oil or concentrate into the bowl 30, while applying suction through the mouthpiece 50 of the neck 20, to draw the vaporized substance into the water chamber 32 and out the mouthpiece 50. Dabbing is just one example of a method of using the water pipe 10, and other methods may be used, such as by depositing the oil or concentrate into the bowl 30 and applying heat until vaporization begins. Referring to FIG. 7, the bowl 30 itself may be provided with an internal heating element 148, for example a resistive coil embedded within the bowl 30.

Referring to FIGS. 6-8, the bowl stem 48 may have a suitable structure. An interior wall 48A of the stem 48 may be cylindrical, tubular, or have another suitable shape. The interior wall 48A of the stem 48 may define a passageway, for example that permits the passage of smoke from the smoking substance 102 into the interior 104 of the water chamber 32. The stem 48 may have a first end 112 that connects to the seat 106, and a second end 114 that extends into the interior 104 of the water chamber 32, thus fluidly connecting the bowl 30 and chamber 32. The stem 48 may define one or more openings, such as slits 110, for example that are submerged with water in the water chamber 32 in use. Slits 110 may be structured to diffuse or percolate the smoke as it exits the stem 48 and passes into the interior 104 of the water chamber 32, for example to increase the water-contact area and improve filtering and cooling. In the example shown the stem 48 is formed integrally with the body of the water chamber 32. In other cases, the stem 48 may be formed by a part separate from chamber 32 and that extends into the interior 104, such as in the case where stem 48 is a tube.

Referring to FIGS. 6 and 8, the neck 20, chamber 32, stem 48, and bowl 30 or bowl connector may collectively form a suitable structure. In the example shown, the neck 20 and water chamber 32 collectively form a stand pipe as shown, for example a vertical or near-vertical tubular structure, which in the example shown has a slight frustoconical shape. The neck 20 may define an axis 68, which may be vertical or near-vertical, or may take other orientations relative to vertical, when the water pipe 10 is resting upon an external surface. The stem 48, which in the example is integrally incorporated into the chamber 32, may branch off of or otherwise form a branch of the chamber 32, in an upward direction, for example such that an axis 69 of the stem 48 defines an acute angle with the axis 68 of the neck 20 as shown. The bowl connector (seat 106 and bowl 30 may be structure such that a rim 30B of the bowl 30 defines a plane 94 that crosses axis 68 of the neck to form an obtuse angle with the axis 68 of the neck.

Referring to FIG. 8, the water pipe 10 may comprise other suitable parts, such as a diffuser. A diffuser, such as a diffuser screen 24, located between the mouthpiece 50 and the water chamber 32, may improve the function of the water pipe 10. The diffuser screen 24 may seat on a shoulder 136 of the ring 26. The diffuser screen 24 may be secured on the shoulder 136 of the ring 26 between the ring 22 and the ring 26. The diffuser screen 24 may define a plurality of holes 138, for example with a suitable shape such as hexagonal holes in a honeycomb arrangement as shown, although other shapes may be used. The diffuser screen 24 may form a splash guard, for example that limits or obstructs passage of water into the hollow neck 20. The diffuser may also act to further cool smoke entering the neck 20, and/or provide a zone of increased surface area upon which entrained liquid may form droplets and be removed from the vapor stream. The diffuser may also form a support for a cooling material such as ice to rest upon.

Referring to FIGS. 1-6 and 8-10, the lid 12 may have a structure suitable for limiting or preventing the release of water and odor from the water chamber 32, the bowl 30, and the hollow neck 20, when the water pipe 10 is not in use. Referring to FIGS. 6 and 8, the lid 12 may be structured to seal the mouthpiece 50 and the bowl 30. The lid 12 may form a cover that forms a seal at a suitable point with the water pipe 10 to achieve the aforementioned purpose of preventing water and odor leakage when the pipe 10 is in storage or being transported but otherwise not in use. Sealing off the mouthpiece and bowl may allow water pipe 10 to hold water during storage.

Referring to FIGS. 6 and 8, the lid 12 may independently seal against both the mouthpiece 50 and the bowl 30 or bowl connector when the lid 12 is in the closed position. The lid 12 may comprise a first part, such as a seal 14, for example that mates or otherwise seals with the mouthpiece 50 when the lid 12 is in the closed position 52. The lid 12 may comprise a second part, such as a seal 18, for example that mates or otherwise seals with the bowl 30 (or bowl connector) when the lid 12 is in the closed position 52. The lid 12 may be structured to compress the first seal 14 and the second seal 18, for example when moving into the closed position 52. Compressing the seals 14 and 18 against the mouthpiece 50 and bowl 30 (or bowl connector) may act to improve or actuate sealing.

Referring to FIGS. 6 and 8, the lid 12 may have a structure suitable for covering the hollow neck 20. The hollow neck 20 may form a first tube 60, and the lid 12 may form a second tube 62. The second tube 62 may fit over and cover the first tube 60 when the lid 12 is in the closed position 52. Thus, when closed, the first tube is nested within the second tube. The first tube 60 defined by the hollow neck 20 may be open-ended, for example to define the mouthpiece 50 as discussed above. The tube 62 defined by the lid 12 may have a closed end 64, for example a closed top end as shown to rest upon the mouthpiece 50 when the lid 12 is in the closed position 52. One or more of the first tube 60 and the second tube 62 may be frustoconical, or have other corresponding shapes to facilitate nesting. The mouthpiece seal 14 may be seated within a corresponding slot 63 contoured within an undersurface of the top end 64 of the tube 62. In the example shown, the seal 14 forms a ring (although other shapes may be used such as a plate shaped seal) that contacts and compresses against an upper peripheral rim 50A defining the mouthpiece 50, to seal off the mouthpiece 50. The tubes 60 and 62 may be oriented coaxial with one another. When the neck 20 is made of glass, the act of positioning the neck 20 securely between gasket or seal 14 and chamber 32 with tube 62 over the neck 20 acts to protect the glass from accidentally breakage from jarring contact or other types of undesirable impact forces.

Figure 1:
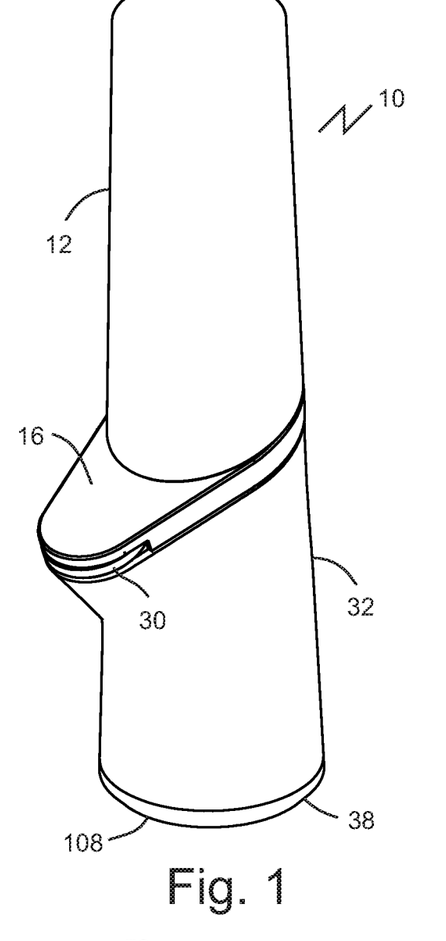
FIG. 1 is a perspective view of a water pipe.
Figure 2:
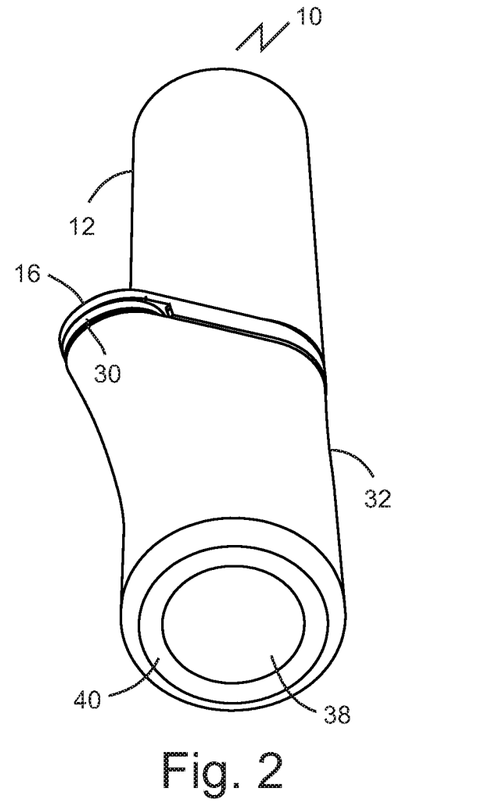
FIG. 2 is a bottom perspective view of the water pipe of FIG. 1.
Figure 3:
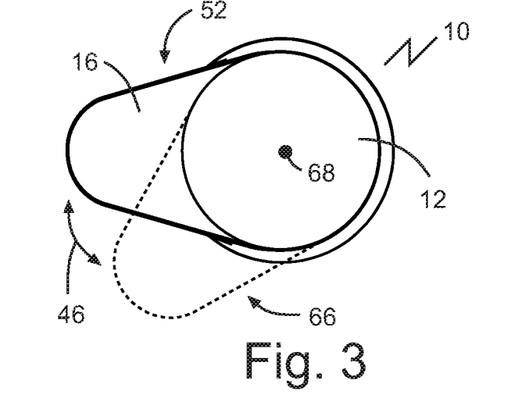
FIG. 3 is a top plan view of the water pipe of FIG. 1 illustrating in dashed lines a rotational range of movement of the lid.
Figure 4:
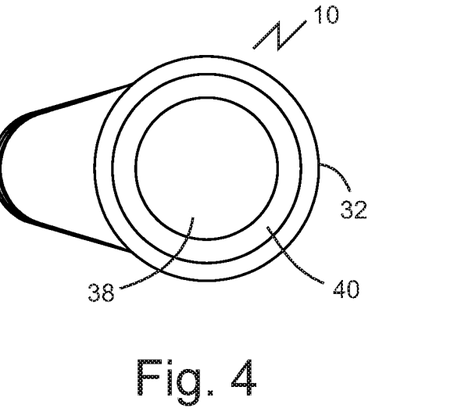
FIG. 4 is a bottom plan view of the water pipe of FIG. 1.

Referring to FIG. 12, the lid 12 and water pipe 10 in general may be structured to permit the lid 12 to move securely into the closed position via a suitable mechanism. For example, the lid 12 may be structured to be translated, for example moved in an axial direction 130, for further example along an axis 68 of the neck 20, into and out of the closed position or into and out of a seated, open position 66 (shown). Referring to FIG. 3, a rotational motion may be used to move into the closed position. The lid 12 may be structured to move, for example rotate, between the seated, open position 66 and the closed position 52. The lid 12 may be structured to be rotated in a direction 46 around the axis 68 of the neck 20, for example between the seated, open position 66 and the closed position 52. Thus, referring to FIGS. 3 and 12, in the example shown the water pipe may have the lid installed by translating the lid 12 along the axis 68 of the hollow neck 20 into the seated, open position, and rotating the lid 12 around the axis 68 of the hollow neck 20 to move the lid 12 into the closed position (shown in solid lines in FIG. 3). Other more complex patterns of movement may be used beyond those of simple rotation or translation movements, including combinations of such movements.

Referring to FIGS. 1, 3, 6, 8-10 and 12, the lid 12 may comprise a flange 16 that is structured to seal to the bowl 30 or bowl connector. The flange 16 may be structured to slide over and seal to the bowl 30 when moving into the closed position 52, for example from the sealed, open position 66 into the closed position 52. The flange 16 may be formed by a plate 74, for example that extends radially from the second tube 62. Referring to FIGS. 6 and 7, the flange 16 may define a base surface 16A (FIG. 7) that is structured to co-define plane 94 with bowl 30/bowl connector when the lid 12 is in the closed position, or to define a plane that is parallel to plane 94. Referring to FIGS. 5-8, the base surface 16A may be indented to form a slot 132, for example that is structured to receive a portion 134 of the bowl 30 (such as the part of the bowl 30 that forms peripheral rim 30B) when the lid 12 is in the closed position 52.

Referring to FIGS. 6-8, the flange 16 may mount the second seal 18. The second seal 18 may be attached to the flange 16 and may be positioned within the cutout or indent or slot 132 or at another suitable location, for example on base surface 16A. Referring to FIGS. 7 and 8, the second seal 18 may have a domed shape, for example whose radial edges 18B are thinner (in axial cross-section as shown in FIG. 7) than an axial center 18A of the second seal 18. Thus, referring to FIGS. 3 and 12-13, when the flange 16 is rotated into the closed position, the relatively thinner edges 18B slide over and engage with the rim 30B.

Figure 9:
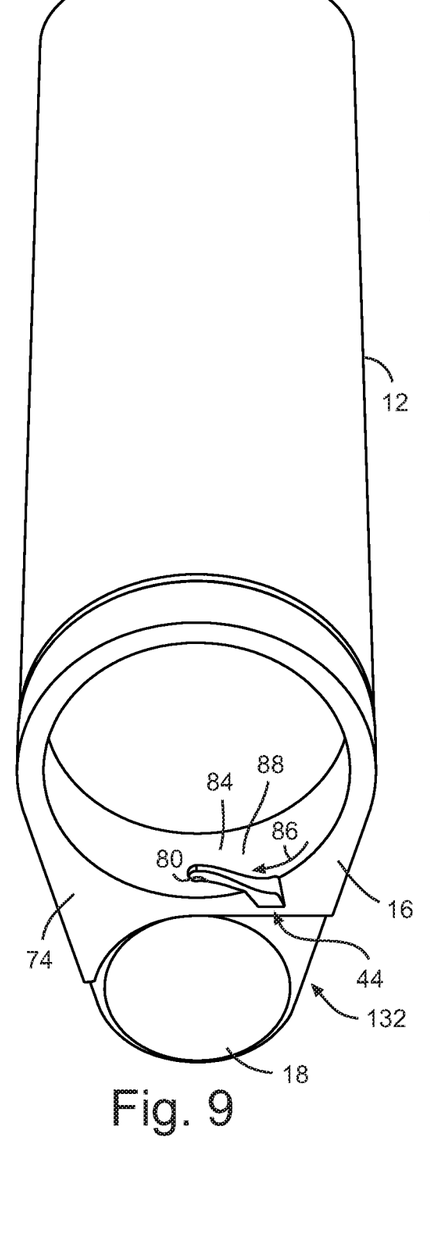
FIG. 9 is a bottom perspective view of the lid of FIG. 1.
Figure 10:
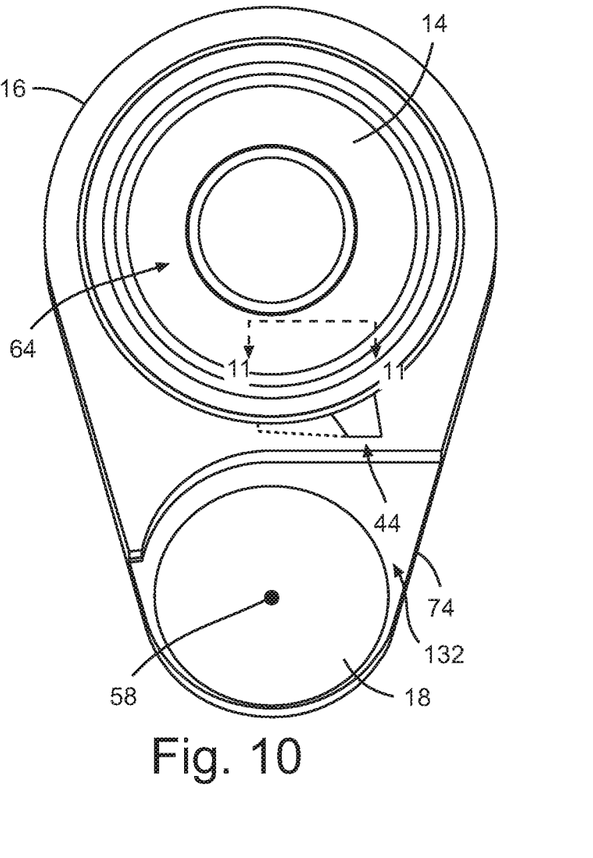
FIG. 10 is a bottom plan view of the lid of FIG. 1.
Figure 11:
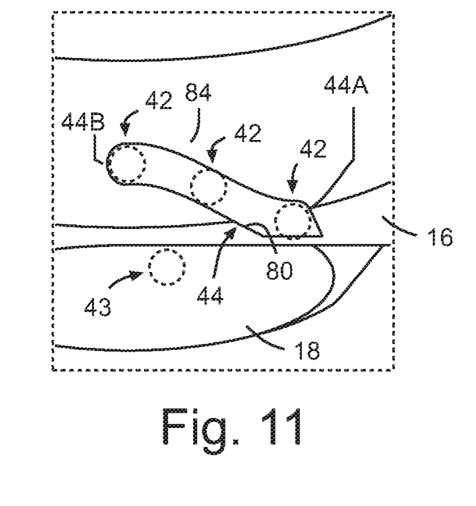
FIG. 11 is a close-up view elevation view take along the 11-11 sight lines from FIG. 9 illustrating the channel in the lid, with various positions of a locking pin relative to the channel illustrated in dashed lines.

Referring to FIGS. 6-13, the lid 12 may be secured in the closed position 52 via a suitable mechanism, such as a lock. The water pipe 10 may comprise a quick-release lock 76, such as a friction lock, for example to secure the lid 12 in the closed position 52. The lock 76 may comprise a pin 28, on one of the lid 12 and the water pipe body 78 (referring to the water chamber 32 and the hollow neck 20, collectively), that in use moves along a guide surface 80, on the other of the lid 12 and the water pipe body 78, to secure the lid 12 in the closed position 52. In the example shown the pin 28 extends radially out of an external surface 82 of the hollow neck 20 or chamber 32, in this case ring 26. Referring to FIGS. 9-11, the guide surface 80 may be formed on an inner surface 84 of the lid 12.

Figure 13:
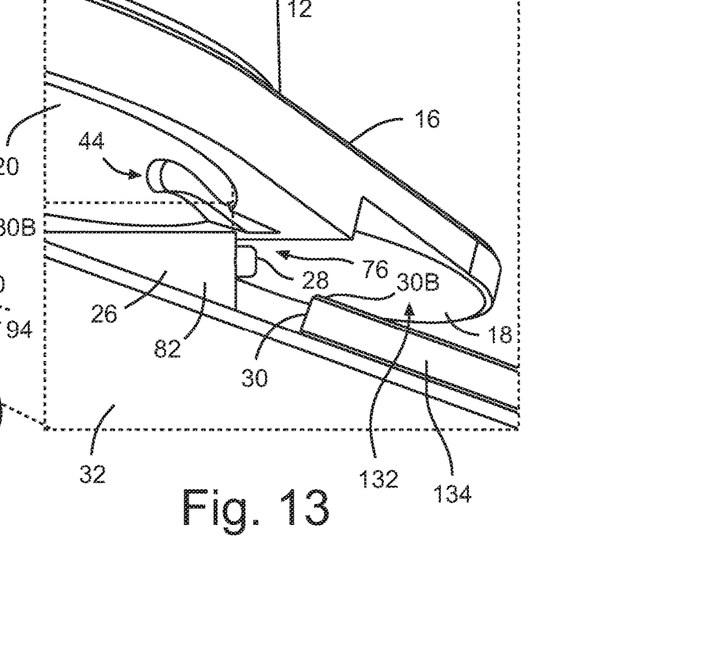
FIG. 13 is a close-up view of the area marked in dashed lines in FIG. 12. with a portion of the hollow neck of the water pipe made transparent and shown in dashed lines so the channel is visible.

Referring to FIGS. 9-13, the pin and guide surface may be structured to achieve a suitable quick-release lock, such as friction lock. The guide surface 80 may form a channel 44, for example that is defined (contoured) in a circumferential direction 86 around at least a portion 88 of the interior wall or surface 84 of the lid 12. Referring to FIGS. 3, 11, and 13, in order to enter the seated, open position, the lid 12 may need to assume a predetermined angular orientation about axis 68, such that pin 28 is located at or within an entrance 44A of the channel 44. If the incorrect angular orientation is adopted, then the lid 12 may need to be rotated until the proper orientation is achieved, to actuate the locking mechanism. Referring to FIG. 11, once the pin 28 enters the entrance 44A of the channel 44, rotation of the lid 12 may cause the pin 28 to traverse the channel 44 to arrive at a locked position 44B within the channel 44. The channel 44 may form a ramp as shown, in order to convert rotation from the lid 12 into compressive force to compress the various seals against the mouthpiece and/or bowl 30 (or bowl connector). the locked position 44B may be located down path of a local maximum in ramp height, to retain the pin 28 in the locked position. A pin is understood to include any part that extends outwardly or inwardly and is engaged within a corresponding guide, and a pin may thus have a suitable shape unrestricted to a cylindrical barrel. The structure shown in the figures permits a reverse rotational movement to unlock the lid 12.

Suitable materials may be used to construct the water pipe 10 or the various parts thereof. For example, lid 12 may be made with powder-coated aluminum, or other suitable metal, polymer, or glass material. Gaskets and seals may be made of suitable materials, such as resilient compressible materials like or including rubber or silicon. Other materials such as stainless steel may be used for various parts of pipe 10. The bowl may be made of metal, ceramic, or other materials suitable to withstand the high temperatures of the vaporization or combustion process intended to be used.

A smokable substance 102 may be stored in the bowl 30 while the lid 12 is in the closed position. The lid 12 may be provided separate from the water pipe 10 or may be connected, for example via a hinge, strap, or other system.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A water pipe comprising:
   a water chamber;
   a bowl or bowl connector;
   a hollow neck forming a mouthpiece; and
   a lid that seals both the mouthpiece and the bowl or bowl connector when the lid is in a closed position;
   in which the lid independently seals against both the mouthpiece and the bowl or bowl connector when the lid is in the closed position; and
   in which the lid comprises:
      a first part that seals with the mouthpiece when the lid is in the closed position; and
      a second part that seals with the bowl or bowl connector when the lid is in the closed position.

2. The water pipe of claim 1 in which the first part and the second part are seals, and the lid is structured to compress the first part and the second part when moving into the closed position.

3. The water pipe of claim 1 in which the second part is a seal that has a domed shape with an axial thickness that is greater at a center of the second part than at a peripheral edge of the second part.

4. The water pipe of claim 1 in which:
   the hollow neck forms a first tube;
   the lid forms a second tube;
   the first tube is nested within the second tube when the lid is in the closed position;
   the first tube is open-ended to define the mouthpiece; and
   the second tube has a closed top end that rests upon the mouthpiece when the lid is in the closed position.

5. The water pipe of claim 4 in which one or more of the first tube and the second tube are frustoconical.

6. The water pipe of claim 1 in which the lid is structured to move between a) a seated, open position and b) the closed position.

7. The water pipe of claim 6 in which the lid is structured to rotate between the seated, open position and the closed position.

8. The water pipe of claim 7 in which the hollow neck defines an axis, and the lid is structured to:
   be translated along the axis of the hollow neck onto the hollow neck into the seated, open position; and
   be rotated around the axis of the hollow neck to move the lid into the closed position.

9. The water pipe of claim 7 in which:
   the lid comprises a flange that is structured to slide over and seal to the bowl or bowl connector when moving into the closed position;
   the lid forms a tube;
   the hollow neck is nested within the tube when the lid is in the closed position; and
   the flange is formed by a plate that extends radially from the tube.

10. The water pipe of claim 1 further comprising a quick-release lock to secure the lid in the closed position.

11. The water pipe of claim 10 in which:
   the water chamber and the hollow neck form a pipe body; and
   the quick-release lock comprises:
      a pin that extends radially out of an external surface of the hollow neck; and
      a guide surface, formed on an inner surface of the lid, along which the pin moves to secure the lid in the closed position; and
   the guide surface forms a channel that is defined in a circumferential direction around at least a portion of the inner surface of the lid.

12. The water pipe of claim 1 in which the hollow neck is threaded to or integrally formed with the water chamber.

13. The water pipe of claim 1 in which:
   the hollow neck forms a stand pipe; and
   a stem of the bowl or bowl connector branches upwardly off the water chamber or hollow neck at an acute angle with an axis of the hollow neck.

14. The water pipe of claim 1 forming one or more of a bong, a quartz banger, and a dabbing rig.

15. The water pipe of claim 1 further comprising the bowl and a heating element within or adjacent the bowl.

16. A method of operating the water pipe of claim 1 comprising assembling the lid in the closed position on the water pipe.

17. A method of operating the water pipe of claim 1 method comprising, while the lid is out of the closed position:
   combusting or vaporizing a smokable substance in the bowl to create smoke vapor; and
   drawing the smoke vapor through the water chamber and out the mouthpiece.

18. The method of claim 17 further comprising assembling the lid in the closed position on the water pipe.

19. A water pipe comprising:
   a water chamber;
   a bowl or bowl connector;
   a hollow neck forming a mouthpiece;
   a lid that seals both the mouthpiece and the bowl or bowl connector when the lid is in a closed position;
   a quick-release lock to secure the lid in the closed position; and
   in which:
      the water chamber and the hollow neck form a pipe body; and
      the quick-release lock comprises:
         a pin that extends radially out of an external surface of the hollow neck; and
         a guide surface, formed on an inner surface of the lid, along which the pin moves to secure the lid in the closed position; and
         the guide surface forms a channel that is defined in a circumferential direction around at least a portion of the inner surface of the lid.

20. A water pipe comprising:
   a water chamber;
   a bowl or bowl connector;
   a hollow neck forming a mouthpiece; and
   a lid that seals both the mouthpiece and the bowl or bowl connector when the lid is in a closed position;
   in which the lid is structured to move between a) a seated, open position and b) the closed position.

21. The water pipe of claim 20 in which the lid is structured to rotate between the seated, open position and the closed position.

22. The water pipe of claim 20 in which the hollow neck defines an axis, and the lid is structured to:
   be translated along the axis of the hollow neck onto the hollow neck into the seated, open position; and
   be rotated around the axis of the hollow neck to move the lid into the closed position.

23. The water pipe of claim 20 in which:
   the lid comprises a flange that is structured to slide over and seal to the bowl or bowl connector when moving into the closed position;
   the lid forms a tube;
   the hollow neck is nested within the tube when the lid is in the closed position; and
   the flange is formed by a plate that extends radially from the tube.

* * * * *